US012234688B1

(12) United States Patent
Pires

(10) Patent No.: US 12,234,688 B1
(45) Date of Patent: Feb. 25, 2025

(54) FOLDAWAY STEPPING STOOL APPARATUS

(71) Applicant: Andrew Pires, Cranford, NJ (US)

(72) Inventor: Andrew Pires, Cranford, NJ (US)

( * ) Notice: Subject to any disclaimer, the term of this patent is extended or adjusted under 35 U.S.C. 154(b) by 203 days.

(21) Appl. No.: 18/099,063

(22) Filed: Jan. 19, 2023

(51) Int. Cl.
*E06C 1/00* (2006.01)
*A47B 97/00* (2006.01)

(52) U.S. Cl.
CPC .............. *E06C 1/005* (2013.01); *A47B 97/00* (2013.01); *A47B 2220/05* (2013.01)

(58) Field of Classification Search
CPC ...... A47B 97/00; A47B 2220/05; E06C 1/005
USPC ........................................................ 312/235.1
See application file for complete search history.

(56) References Cited

U.S. PATENT DOCUMENTS

| | | | |
|---|---|---|---|
| 2,581,488 | A | 1/1952 | Keltner et al. |
| 3,030,166 | A | 4/1962 | Richards et al. |
| 3,136,386 | A | 6/1964 | Horvath et al. |
| D260,683 | S | 9/1981 | Kokoska |
| 4,846,304 | A | 7/1989 | Rasmussen |
| 5,005,667 | A | 4/1991 | Anderson |
| 5,085,290 | A | 2/1992 | Guirlinger |
| 5,131,492 | A | 7/1992 | Caminiti et al. |
| 5,755,498 | A | 5/1998 | Cutler |
| 5,967,255 | A | 10/1999 | Young |
| 9,617,788 | B2 | 4/2017 | Goodson |
| 9,883,741 | B2 | 2/2018 | Demasi, III |
| 2018/0363372 | A1 | 12/2018 | Cornthwaite |

OTHER PUBLICATIONS

Noelle Adams, Pinterest Website, https://www.pinterest.com/pin/639652571987776611/?mt=login.

*Primary Examiner* — Daniel J Troy
*Assistant Examiner* — Timothy M Ayres
(74) *Attorney, Agent, or Firm* — Goldstein Law Offices, P.C.

(57) ABSTRACT

A foldaway stepping stool apparatus includes a backplate attachable to a cabinet and a stepping stool mountable onto the backplate. The stepping stool is configurable into deployed and folded configurations. The stepping stool includes a platform, a pivotable front leg, a pivotable rear leg, a latch, and a bracket coupling the latch and the front leg. The latch operates to lock the stepping stool in the deployed configuration and to secure and free the bracket, enabling movement of the stepping stool between the deployed and folded configurations. The backplate includes a track for removably receiving the stepping stool. The track enables the stepping stool to slide in and out thereof to attach and detach, respectively, for use at the cabinet or away from the cabinet. The track further enables the stepping stool to slide therethrough to contact a floor to support the cabinet while the apparatus is mounted thereon.

20 Claims, 10 Drawing Sheets

FOLDAWAY STEPPING STOOL APPARATUS

TECHNICAL FIELD

The present disclosure relates generally to stepping stools. More particularly, the present disclosure relates to a retrofit foldaway stepping stool apparatus mountable onto the inside of a cabinet door.

BACKGROUND

The need for step stools to help people reach items in kitchens and bathrooms has long been established. Small adults need a stool to reach items on the upper shelves of cabinets in the kitchen and young children need a stool to reach items on the countertop, mainly the sink in the kitchen and bathroom. Indeed, there are more than 110 million people in the United States whose height is 5 feet, 4 inches, or below, approximately 73 million children in the U.S., and there are more than 123.6 million households in the U.S. in which stools of this nature are needed. It is apparent from this information that the need for step stools is one that directly affects a large portion of the United States' population, and indirectly affects the remaining portion through its association with family and friends who are of direct need.

The need for and use of stools in the U.S. is indisputably great. Thus, so are the problems which are commonly associated with using them. One problem is what to do with the stool when it is not in use. Presently, there is no simple, affordable, universal solution available. When not in use, stools are commonly left on the floor where they cause an annoying clutter problem and a dangerous trip hazard. If the stool is stored when not in use, it takes up valuable storage space and becomes inconvenient to use. Another problem is that current retrofit foldaway cabinet stepping stools do not adequately offset pressure or weight from the cabinet. Rather, their design requires the cabinet to bear too much weight, ultimately causing the cabinet to break. Yet another problem is that current retrofit foldaway cabinet stepping stools do not have adequate locking mechanisms to lock the stepping stool in place and stabilize the stepping stool from lateral movement causing them to be shacky and unbalanced, which could lead to serious injuries.

This invention directly solves the clutter and storage problem. While it provides a large, sturdy step in the needed places, as do standard step stools, when not in use it folds conveniently away flat against the inside of nearly any cabinet door. It is designed specifically to be easy to install, simple and convenient to use, inexpensive, and usable in conjunction with nearly any cabinet door.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a foldaway stepping stool that may be retrofit onto the interior surface of a cabinet door and used either locally at the door or remotely away from the door. Accordingly, the present disclosure provides a foldaway stepping stool including a backplate removably attachable to the interior surface of a cabinet door and a stepping stool assembly that may engage with the backplate for usage at the door and disengage from the backplate for usage remotely. The backplate includes a track for removably receiving the stepping stool apparatus. The track enables the rear leg assembly to slide vertically along the track with respect to the cabinet door for use of the stepping stool assembly at the door and enables the rear leg assembly to slide entirely out of the track to detach the stepping stool assembly entirely from the backplate for use of the stepping stool assembly away from the door.

Another aspect of an example embodiment in the present disclosure is to provide a foldaway stepping stool that supports the cabinet door when used at, or while attached to, the cabinet door. Accordingly, the track further enables the rear leg assembly to slide through the track to contact a floor surface underneath the cabinet door to support the cabinet door and foldaway stepping stool apparatus in a stabilized configuration.

Another aspect of an example embodiment in the present disclosure is to provide a stepping stool assembly that may be collapsed into a folded configuration and extended into a deployed configuration for quick and convenient use of the stepping stool apparatus. Accordingly, the stepping stool assembly includes a stepping platform, a front leg assembly pivotably connected to a front end of the stepping platform, a rear leg assembly pivotably connected to a rear end of the stepping platform, a stretcher beam pivotably interconnecting the rear leg assembly and the front leg assembly, thereby enabling parallel movement of the front leg assembly relative to the rear leg assembly, a latch mechanism coupled to the stepping platform, and a bracket slidably coupled to the latch mechanism and pivotably connected to the front leg assembly. The latch mechanism secures and frees movement of the bracket, which in turn secures and frees movement of the front leg assembly with respect to the rear leg assembly and the stepping platform to enable selective movement of the stepping stool assembly between the deployed configuration and the folded configuration.

Another aspect of an example embodiment in the present disclosure is to provide a stepping stool assembly that may be secured in an extended and deployed configuration. Accordingly, the latch mechanism locks the stepping stool assembly in the deployed configuration to secure the stepping stool assembly in position and prevent inadvertent lateral movement of the stepping stool assembly. The latch mechanism includes a latch pivotally connected to a latch compartment. The latch includes a flange and a lever for pivoting the latch with respect to the latch compartment between a locking position and an unlocking position. The latch compartment includes a slot for receiving the flange therethrough. The latch is biased toward the locking position in which the flange extends through the slot. The latch is pivotable to the unlocking position in which the flange is positioned external to the slot by depressing the lever toward the lower surface of the stepping platform. When the stepping stool assembly is in the deployed configuration the flange extends through the slot trapping the bracket between the flange and a front end of the latch compartment, thereby locking the bracket in position and securing the front leg assembly in position.

Another aspect of an example embodiment in the present disclosure is to provide a foldaway stepping stool that may be easily stowed when not in use. Accordingly, the stepping platform includes a hole disposed on the front end while the backplate includes a hook member configured to removably engage the hole of the stepping platform to hold the stepping stool assembly in the folded configuration against the backplate for stowing.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
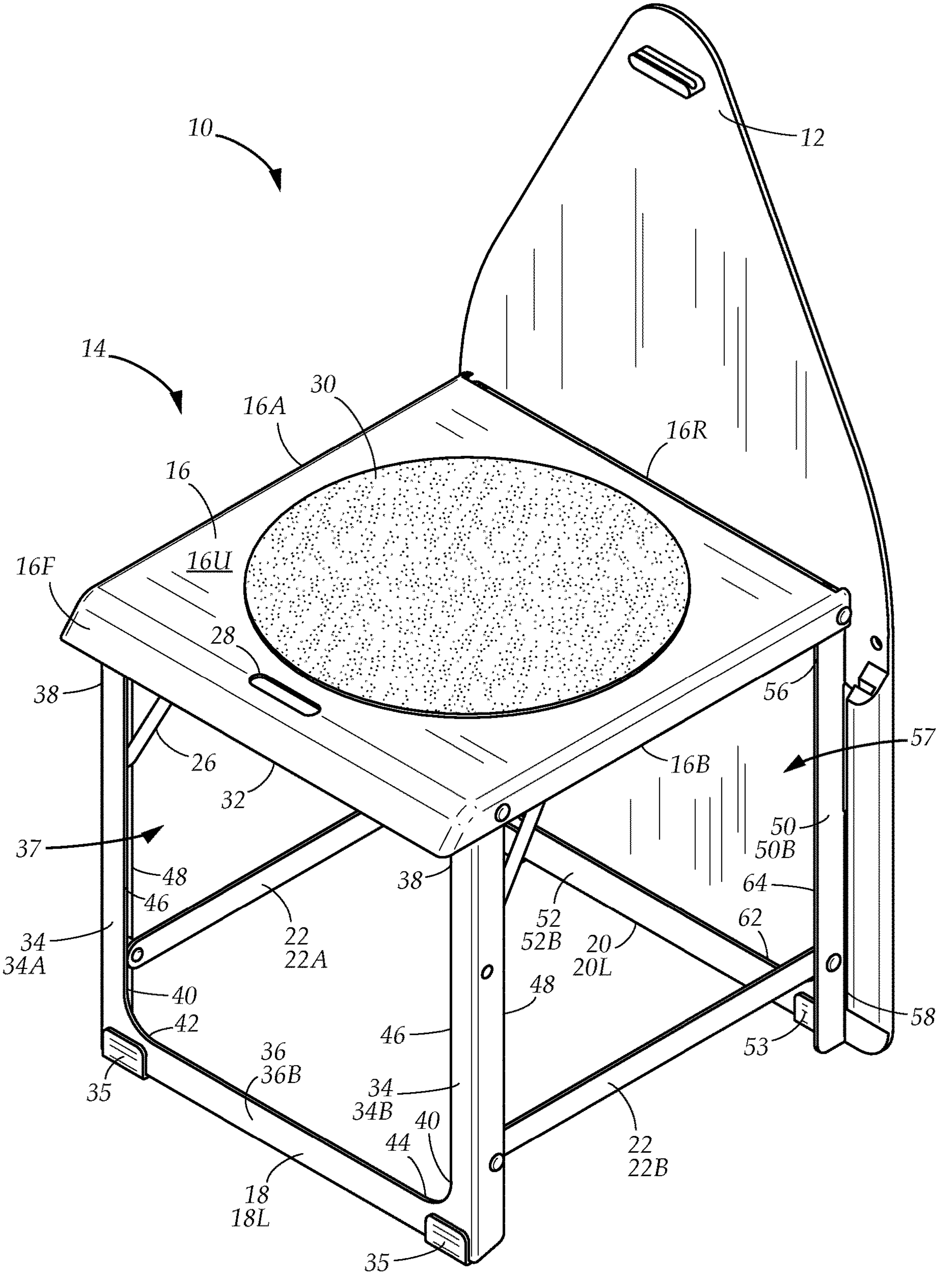
FIG. 1 is a top perspective view of the foldaway stepping stool not mounted onto a cabinet door, illustrating the stepping stool assembly mounted onto the backplate of the foldaway stepping stool in its deployed configuration according to one embodiment of the present disclosure.
Figure 2:
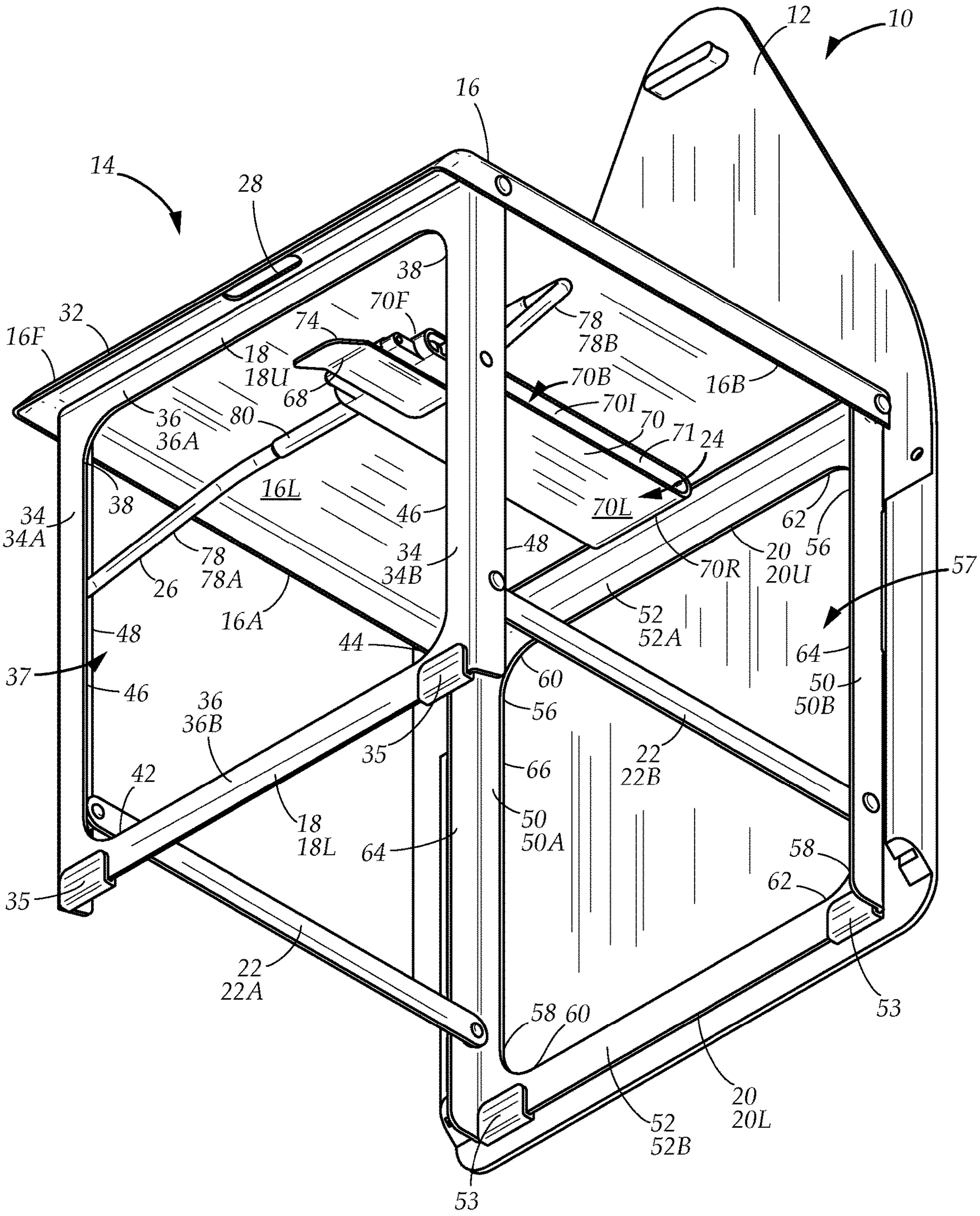
FIG. 2 is a bottom perspective view of the foldaway stepping stool not mounted onto a cabinet door, illustrating the stepping stool assembly mounted onto the backplate of the foldaway stepping stool in its deployed configuration, and further illustrating the latch mechanism locking the stepping stool assembly in its deployed configuration according to one embodiment of the present disclosure.
Figure 3:
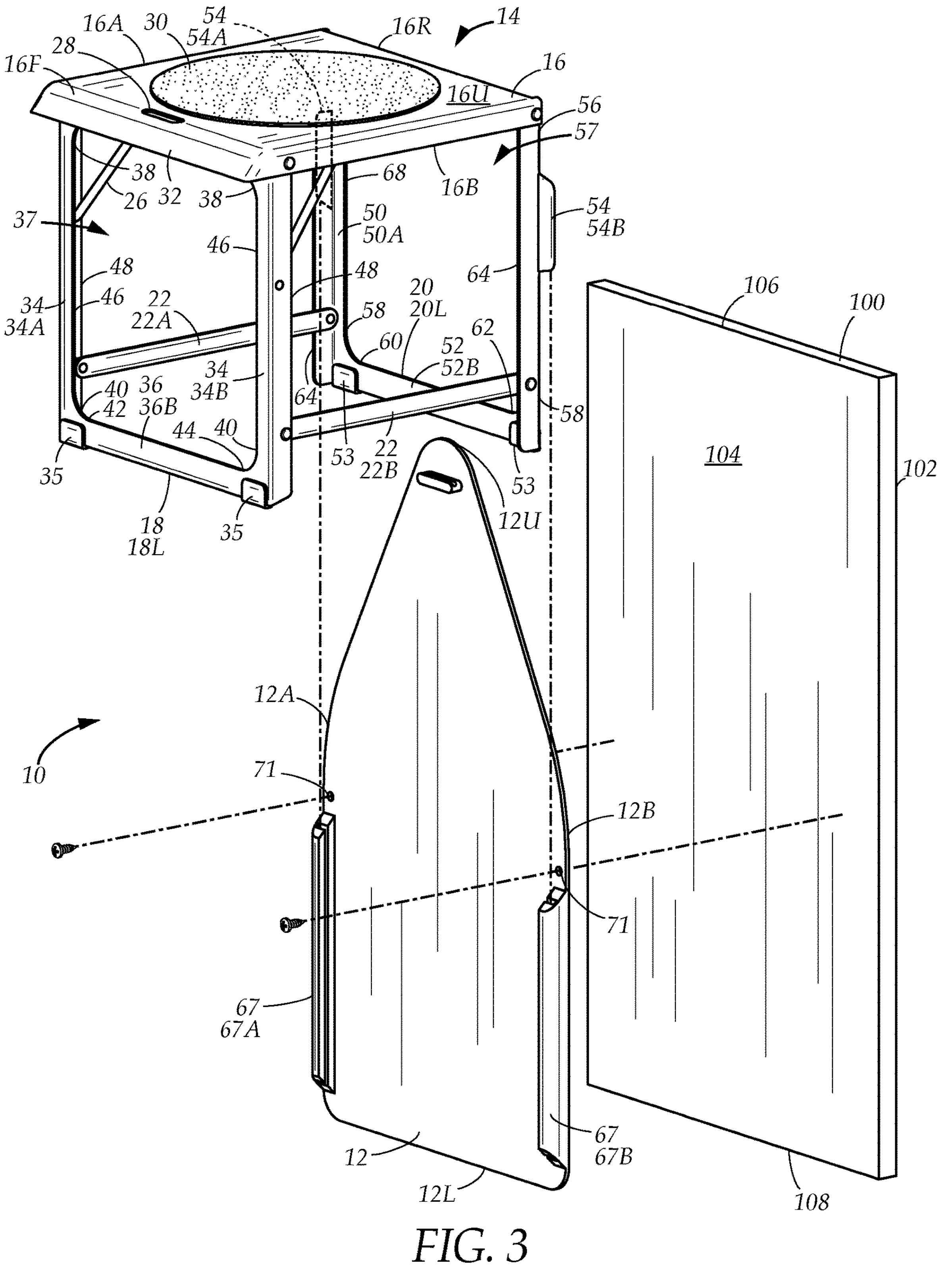
FIG. 3 is an exploded view of the foldaway stepping stool being mounted onto the interior surface of a cabinet door, illustrating a manner in which the backplate is mounted to the interior surface of a cabinet door and a manner in which the stepping stool assembly is mounted onto the tracks of the backplate according to one embodiment of the present disclosure.

FIG. 1, FIG. 2, and FIG. 3 illustrate a foldaway stepping stool 10 configured to retrofit onto a cabinet door 100 having an exterior surface 102, an interior surface 104, an upper edge 106, and a lower edge 108. The foldaway stepping stool 10 comprises a backplate 12 removably attachable to the interior surface 104 of the cabinet door 100 and a stepping stool assembly 14 removably attachable to the backplate 12. In this way, the stepping stool assembly 14 may be attached to the backplate 12 for usage at the cabinet door 100 or removed from the backplate 12 for remote use. The stepping stool assembly 14 is collapsible into a folded configuration for stowing and extendable into a deployed configuration for usage.

The stepping stool assembly 14 includes a planar stepping platform 16, a front leg assembly 18 pivotably connected to the stepping platform 16, a rear leg assembly 20 pivotably connected to the stepping platform 16, a stretcher beam 22 interconnecting the front leg assembly 18 and the rear leg assembly 20, a latch mechanism 24 for selectively locking the stepping stool assembly 14 in the deployed configuration and releasing the stepping stool assembly 14 enabling transition to the folded configuration, and a bracket 26 coupling the front leg assembly 18 to the latch mechanism 24.

In embodiments, the stepping platform 16 includes a rear end 16R, a front end 16F opposite the rear end 16R, a left side 16A, a right side 16B opposite the left side 16A, an upper surface 16U, and a lower surface 16L opposite the upper surface. The stepping platform 16 comprises a hole 28 disposed on the front end 16F. The hole 28 extends entirely through the stepping platform 16 from the upper surface 16U to the lower surface 16L, providing an area for a user to grasp and manipulate, or maneuver, the stepping stool assembly 14. In some embodiments, the stepping platform 16 comprises a circular gripping area 30 spanning most of the area of the upper surface 16U to provide traction when a user steps on the stepping platform 16. In other embodiments, the front end 16F of the stepping platform 16 includes a lip 32 extending diagonally outwardly, or downwardly outwardly, facilitating access to the hole 28 and latch mechanism 24 by a user.

In embodiments, the front leg assembly 18 comprises an upper end 18U, a lower end 18L opposite the upper end 18U, a pair of vertical support members 34 aligned and parallel with respect to each other, and a pair of horizontal support members 36 aligned and parallel with respect to each other. The upper end 18U is pivotably connected to the front end 16F of the stepping platform 16F. The upper end 18U spans substantially the length of the front end 16F. The pair of vertical support members 34 are connected to the pair of horizontal support members 36 forming a rectangular frame supporting the stepping platform 16. In some embodiments, the rectangular frame is continuous and defines a first opening 37.

In some embodiments, the pair of vertical support members 34 include a first front leg assembly vertical support member 34A and second front leg assembly vertical support member 34B each having an upper end 38 and a lower end 40. In some embodiments, the pair of horizontal support members 36 include a first front leg assembly horizontal support member 36A and a second front leg assembly horizontal support member 36B each having a first end 42 and a second end 44. In some embodiments, the upper ends 38 of the pair of vertical support members 34A, 34B are attached to, or are integral with, the first and second ends 42, 44, respectively, of one of the pair of horizontal support members 36A, 36B, while the lower ends 40 of the pair of vertical support members 34A, 34B are attached to, or are integral with, the first and second ends 42, 44, respectively, of the other of the pair of horizontal support members 36A, 36B. In some embodiments, the first front leg assembly horizontal support member 36A abuts and spans substantially the length of the stepping platform 16, defining the upper end 18U of the front leg assembly 18, while the second front leg assembly horizontal support member 36B is configured to contact a floor surface, defining the lower end 18L of the front leg assembly 18. In some embodiments, the second front leg assembly horizontal support member 36B includes one or more grips 35 for gripping the floor surface and helping maintain the stepping stool assembly 14 in position while deployed and in use. In some embodiments, the pair of vertical support members 34 include right angle beams having a first portion 46 and a second portion 48 arranged orthogonally with respect to each other to provide structural support to the stepping stool assembly 14 in two different planes.

In embodiments, the rear leg assembly 20 includes an upper end 20U, a lower end 20L, a pair of vertical support members 50 aligned and parallel with respect to each other, a pair of horizontal support members 52 aligned and parallel with respect to each other, and a pair of guide members 54 protruding outwardly from the pair of vertical support members 50. The upper end 20U of the rear leg assembly 20 is pivotably connected to the rear end 16R of the stepping platform 16. The upper end 20U substantially spans the length of the rear end 16R of the stepping platform 16. The pair of vertical support members 50 are connected to the pair of horizontal support members 52 forming a rectangular frame supporting the stepping platform 16. In some embodiments, the rectangular frame is continuous and defines a second opening 57.

In some embodiments, the pair of vertical support members 50 include a first rear leg assembly vertical support member 50A and a second rear leg assembly vertical support member 50B each having an upper end 56 and a lower end 58. In some embodiments, the pair of horizontal support members 52 include a first rear leg assembly horizontal support member 52A and a second rear leg assembly horizontal support member 52B each having a first end 60 and a second end 62. In some embodiments, the upper ends 56 of the pair of vertical support members 50A, 50B are attached to, or are integral with, the first and second ends 60, 62, respectively, of one of the pair of horizontal support members 52A, 52B, while the lower ends 58 of the pair of vertical support members 50A, 50B are attached to, or are integral with the first and second ends 60, 62, respectively, of the other of the pair of horizontal support members 52A, 52B. In some embodiments, the first rear leg assembly horizontal support member 52A abuts and spans substantially the length of the stepping platform 16, defining the upper end 20U of the rear leg assembly 20, while the second rear leg assembly horizontal support member 52B is configured to contact a floor surface, defining the lower end 20L of the rear leg assembly 20. In some embodiments, the second rear leg assembly horizontal support member 52B include one or more grips 53 for gripping the floor surface and helping maintain the stepping stool assembly 14 in position while deployed and in use. In some embodiments, the pair of vertical support members 50 include right angle beams having a first portion 64 and a second portion 66 arranged orthogonally with respect to each other to provide structural support to the stepping stool assembly 14 in two different planes.

In embodiments, the pair of guide members 54 include a first guide member 54A disposed on the upper end 56 of the first rear leg assembly vertical support member 50A and a second guide member 54B disposed on an upper end 56 of the second rear leg assembly vertical support member 50B. The guide members 54A, 54B may include flat and planar members extending laterally outwardly from the vertical support members 50A, 50B. The guide members 54A, 54B may include a thickness less than a width of the vertical support members 50A, 50B. The guide members 54A, 54B are removably attachable to the backplate 12 enabling selective attachment to and detachment from the backplate 12.

The stretcher beam 22 is pivotably connected to the lower end 20L of the rear leg assembly 20 and pivotably connected to the lower end 18L of the front leg assembly 18. The stretcher beam 22 interconnects the rear leg assembly 20 and the front leg assembly 18 to enable parallel movement of the front leg assembly 18 relative to the rear leg assembly 20. In some embodiments, the stretcher beam 22 comprises a first stretcher beam 22A and a second stretcher beam 22B. The first stretcher beam 22A interconnects the first front leg assembly vertical support member 34A and the first rear leg assembly vertical support member 50A enabling parallel movement of the first front leg assembly vertical support member 34A and the first rear leg assembly vertical support member 50A with respect to each other. The second stretcher beam 22B interconnects the second front leg assembly vertical support member 34B and the second rear leg assembly vertical support member 50B enabling parallel movement of the second front leg assembly vertical support member 34B and the second rear leg assembly vertical support member 50B with respect to each other.

Figure 7:
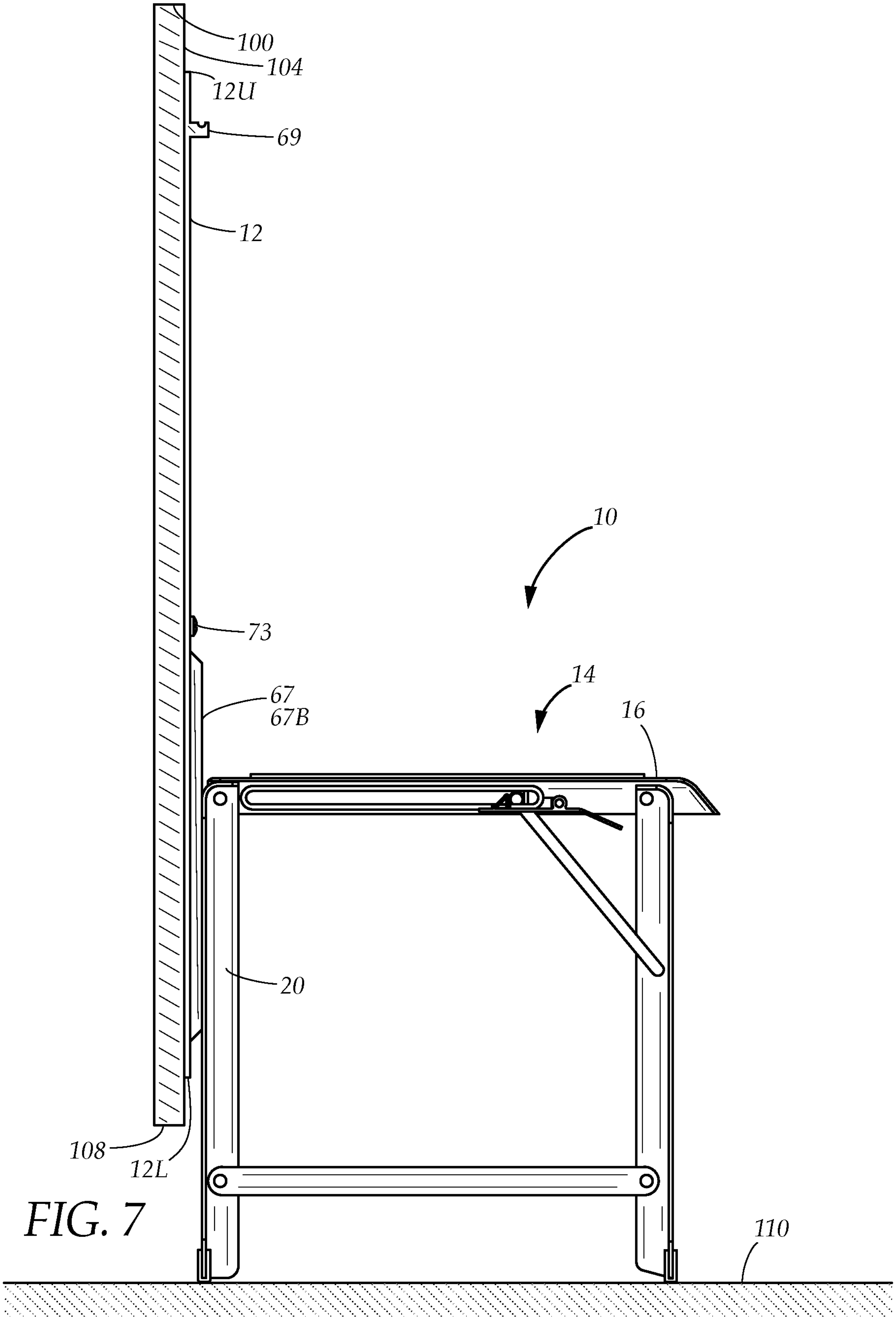
FIG. 7 is a side view of the foldaway stepping stool mounted onto the interior surface of a cabinet door, illustrating the stepping stool assembly in its deployed configuration and positioned along the track of the backplate such that the stepping stool assembly is contacting the floor and supporting the cabinet door and foldaway stepping stool in a stabilized configuration according to one embodiment of the present disclosure.

Referring to FIG. 3 and FIG. 7, in embodiments, the backplate 12 includes a planar body including an upper end 12U, a lower end 12L opposite the upper end 12U, a left side 12A, a right side 12B opposite to and parallel with the left side 12A, a track 67 for removably receiving the rear leg assembly 20 when the backplate 12 is attached to the cabinet door 100. The planar body may be thin and include a uniform cross-sectional area. The track 67 enables the rear leg assembly 20 to slide vertically along the track 67 with respect to the cabinet door 100 and detach entirely from the backplate 12 for remote use. The rear leg assembly 20 is capable of sliding through the track 67 to contact a floor surface 110 when the backplate 12 is attached to the cabinet door 100, thereby supporting the cabinet door 100 and foldaway stepping stool apparatus 10 in a stabilized configuration. The backplate 12 further comprises a fastener for attaching and securing the backplate 12 to the interior surface 104 of the cabinet door 100. In some embodiments, the fastener comprises one or more apertures 71 for receiving a fastener 73, such as a screw, therethrough to fasten the backplate 12 to the interior surface 104 of the cabinet door 100. In some embodiments, the backplate 12 further comprises a hook member 69 disposed on the upper end 12U of the backplate 12 configured to removably engage the hole 28 of the stepping platform 16 to hold the stepping stool assembly 14 in the folded configuration against the backplate 12 for stowing. In other embodiments, the backplate 12 tapers in width from the track 67 to the upper end 12U to form a more streamlined and less bulky backplate 12.

In embodiments, the track 67 comprises a pair of vertically extending tracks protruding outwardly from the left side 12A and right side 12B of the backplate 12. The track includes a first track 67A extending vertically along the left side 12A of the backplate 12 and a second track 67B extending vertically along the right side 12B of the backplate 12. The first track 67A and the second track 67B are aligned and parallel with respect to each other. The left side 12A and the right side 12B of the backplate 12 each define an edge along which the first track 67A and the second track 67B extend and protrude, respectively. The first guide member 54A and the second guide member 54B are slidably engageable with the first track 67A and second track 67B, respectively, such that when the stepping stool assembly 14 is attached to the backplate 12 the first and second guide members 54A, 54B are slidably disposed within the first and second tracks 67A, 67B, respectively. In this way, the pair of vertically extending tracks 67A, 67B enable the rear leg assembly 20 to slide vertically downwardly along the backplate 12 past the lower edge 108 of the cabinet door 100 to contact the floor surface 110.

Figure 4:
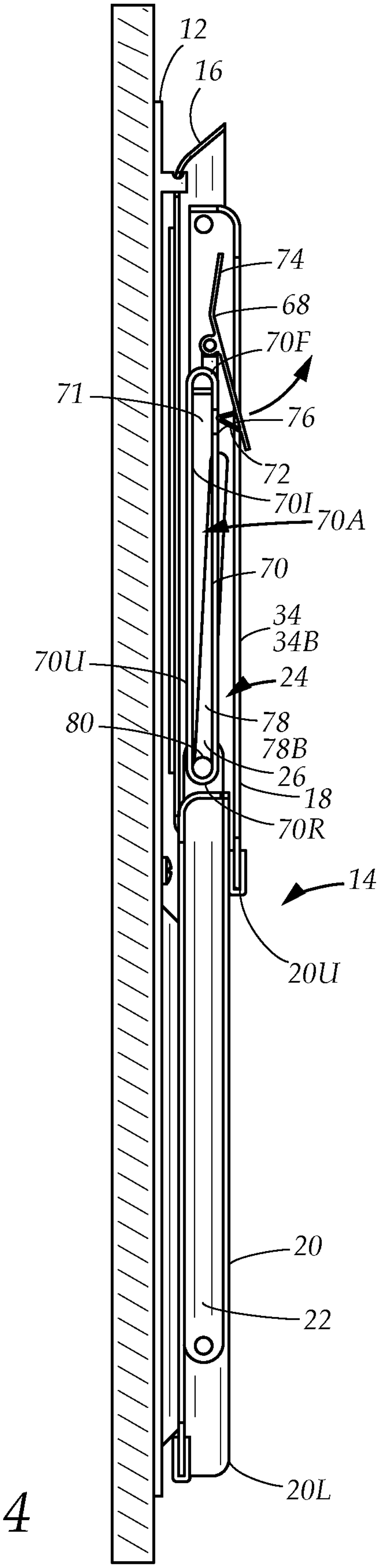
FIG. 4 is a cross-sectional view of the foldaway stepping stool mounted onto the interior surface of a cabinet door, illustrating the stepping stool assembly suspended in its folded configuration by the backplate and further illustrating a manner in which the latch mechanism may release the stepping stool assembly from its folded configuration enabling transition to its deployed configuration according to one embodiment of the present disclosure.
Figure 5:
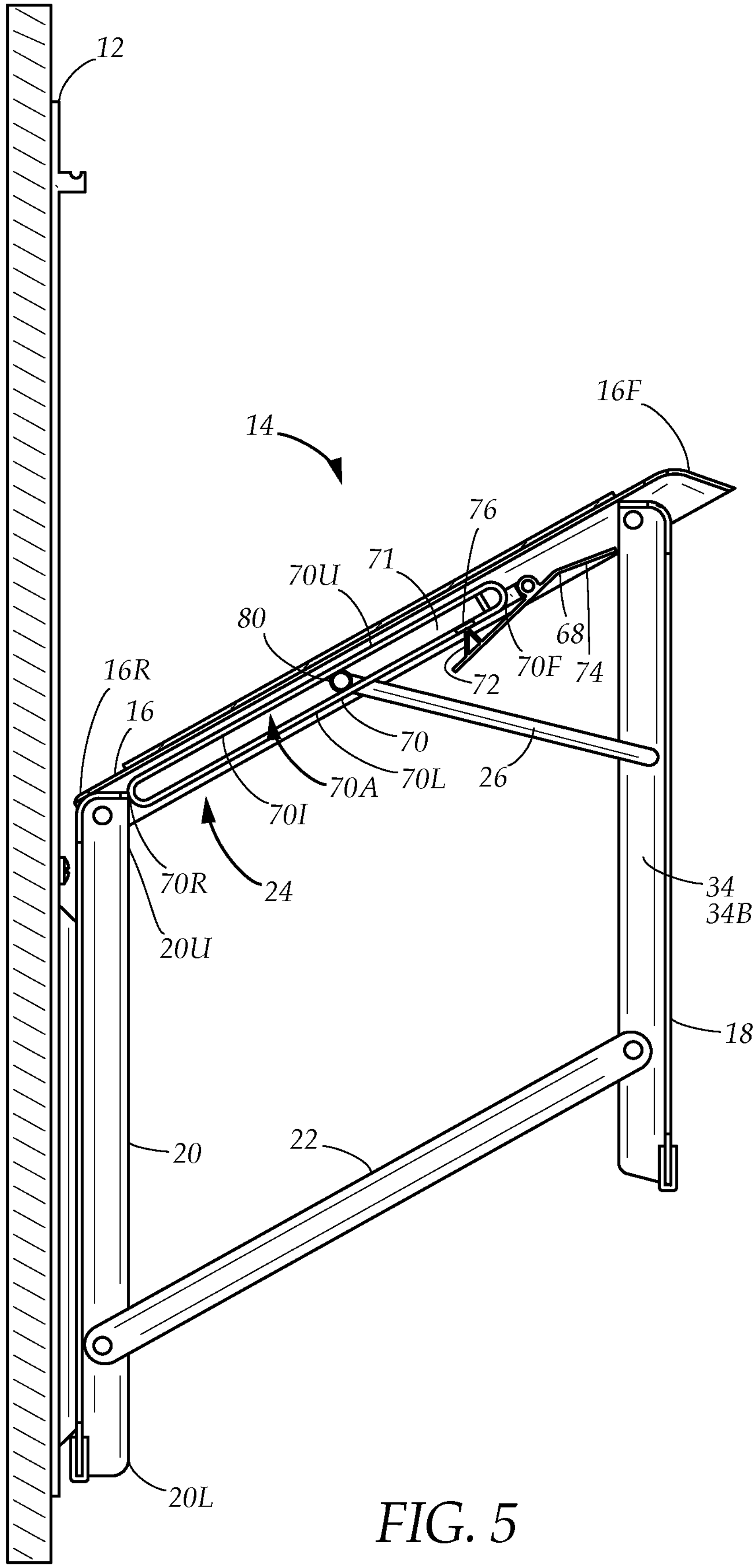
FIG. 5 is a cross-sectional view of the foldaway stepping stool mounted onto the interior surface of the cabinet door, illustrating the stepping stool assembly transitioning from its folded configuration in FIG. 4B to its deployed configuration according to one embodiment of the present disclosure.
Figure 6:
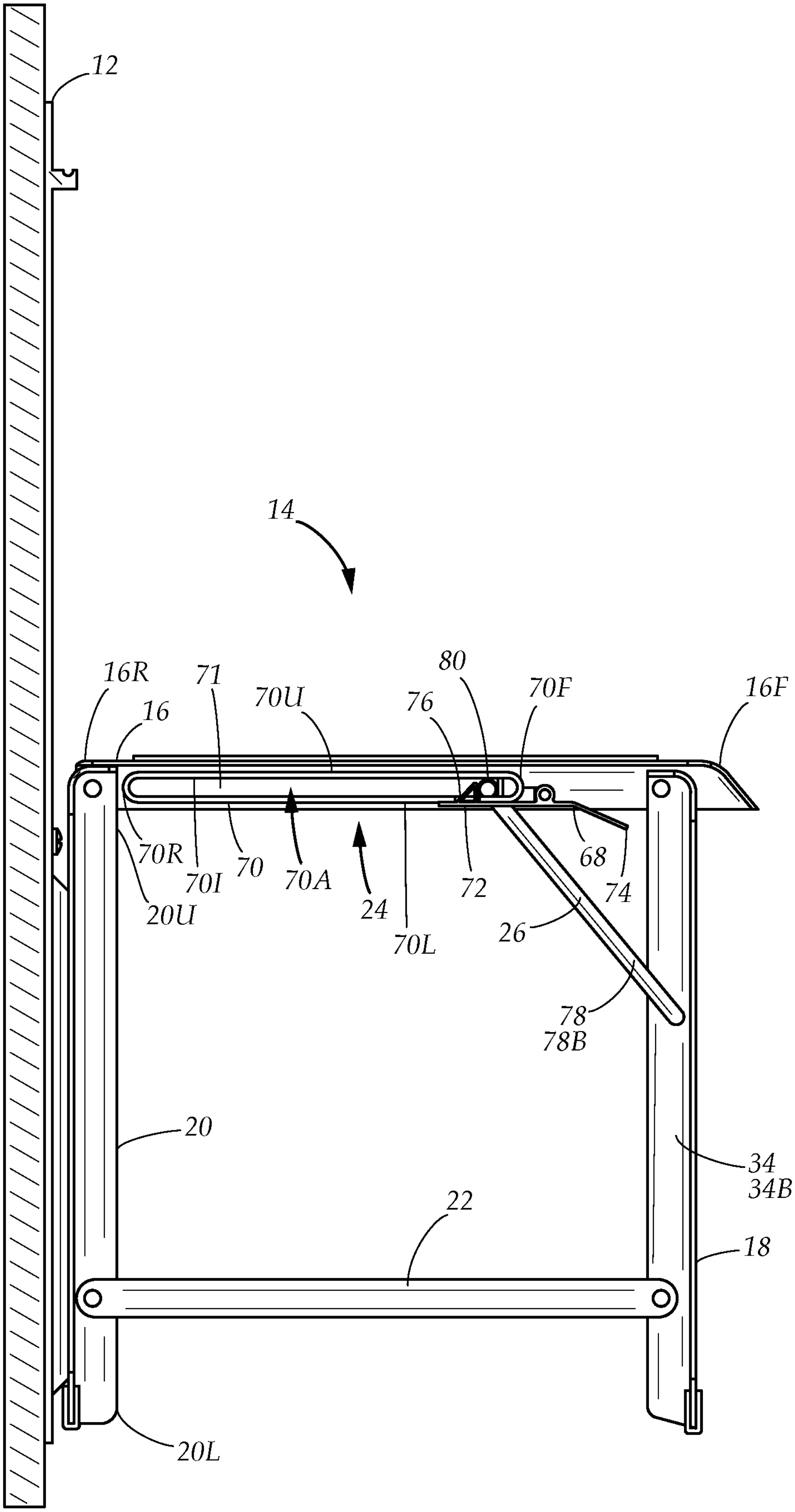
FIG. 6 is a cross-sectional view of the foldaway stepping stool mounted onto the interior surface of a cabinet door, illustrating the stepping stool assembly in its deployed configuration and positioned along the track of the backplate such that the stepping stool assembly is not contacting the floor and supporting the cabinet door and foldaway stepping stool in a stabilized configuration according to one embodiment of the present disclosure.

Referring now to FIG. 4, FIG. 5, and FIG. 6, in conjunction with FIG. 2, in embodiments, the latch mechanism 24 is disposed on the lower surface 16L of the stepping platform 16. The latch mechanism 24 is configured to lock the stepping stool in the deployed configuration to secure the stepping stool assembly 14 in position and prevent inadvertent lateral movement of the stepping stool assembly 14. The latch mechanism 24 comprises a latch 68 pivotally coupled to a latch compartment 70. The latch 68 includes a flange 72 and a lever 74 for pivoting the latch 68 with respect to the latch compartment 70 between a locking position and an unlocking position. The latch compartment 70 is positioned substantially centrally on the lower surface 16L of the stepping platform 16. The latch compartment 70 includes a length extending from the front end 16F of the stepping platform 16 toward the rear end 16R of the stepping platform, a back end 70R adjacent to the rear end 16R of the stepping platform 16, a front end 70F adjacent to the front end 16F of the stepping platform 16, a first open side 70A extending from the back end 70R to the front end 70F of the latch compartment 70, a second open side 70B (shown in FIG. 2) extending from the back end 70R to the front end 70F of the latch compartment 70, a hollow interior 701 spanning the latch compartment 70, a top surface 70U positioned against the lower surface 16L of the stepping platform 16, a lower surface 70L opposite the top surface 70U, and a slot 76 disposed in the lower surface 70L. The hollow interior 701 extends from the first open side 70A to the second open side 70B and from the front end 70F to the back end 70R forming an opening extending transversely across the latch compartment 70 that defines a track 71 for guiding the bracket 26 longitudinally along the latch compartment 70. The slot 76 is adjacent to the front end 70F of the latch compartment and is configured to receive the flange 72 therethrough. The latch 68 is biased toward the locking position in which the flange 72 extends through the slot 76. The latch 68 is pivotable to the unlocking position in which the flange 72 is positioned external to the slot 76 by depressing the lever 74 toward the lower surface 16L of the stepping platform 16.

The bracket 26 is slidably disposed within the hollow interior 701 of the latch compartment 70 and pivotally connected to the front leg assembly 18. The bracket 26 comprises a U-shaped member including a pair of lateral members 78 interconnected by a transverse member 80. The pair of lateral members 78 include a first lateral member 78A connected to the first front leg assembly vertical support member 34A and a second lateral member 78B connected to the second front leg assembly vertical support member 34B. The transverse member 80 extends through the track 71 of the latch compartment 70 and is slidable longitudinally along the track 71 between the back end 70R and the front end 70F of the latch compartment 70. The latch mechanism 24 secures and frees movement of the bracket 26, which in turn secures and frees movement of the front leg assembly 18 with respect to the rear leg assembly 20 and the stepping platform 16 to enable selective movement of the stepping stool assembly 14 between the deployed configuration and the folded configuration.

In the deployed configuration, as shown in FIG. 6, the flange 72 extends through the slot 76 trapping the transverse member 80 between the flange 72 and the front end 70F of the latch compartment 70, thereby locking the bracket 26 in position. When the bracket 26 is locked in this position, the pair of lateral members 78 extend diagonally, or at an angle, with respect to the front leg assembly 18 and the stepping platform 16, securing the front leg assembly 18 and the rear leg assembly 20 in an extended configuration. When the front and rear leg assemblies 18, 20 are secured in their extended configurations, the front and rear leg assemblies 18, 20 are substantially perpendicular with respect to the stepping platform 16.

In the folded configuration, as shown in FIG. 4, the transverse member 80 is freed from between the flange 72 and the front end 70F of the latch compartment 70 and positioned against the back end 70R of the latch compartment 70. Further, the front and rear leg assemblies 18, 20 and the pair of lateral members 78 are substantially parallel with respect to the stepping platform 16 and each other. When the stepping stool assembly 14 is mounted onto the backplate 12, the stepping platform 16 lies substantially flat against the backplate 12, while the front leg assembly 18 and rear leg assembly 20 are parallel with respect to each other and the transverse member 80 is positioned in the back end 70R of the latch compartment 70.

To transition the stepping stool assembly 14 from the deployed configuration to the folded configuration, and vice versa, as shown in FIG. 5, the lever 74 is depressed toward the stepping platform 16, thereby moving the latch 68 into the unlocked configuration and enabling the transverse member 80 to slide freely along the latch compartment 70 between the front end 70F and the back end 70R. Once the transverse member 80 is able to slide freely along the latch compartment 70, a user may pivot the stepping platform 16 with respect to the upper end 20U of the rear leg assembly 20. The user may either pivot the stepping platform 16 upwardly and away from the lower end 20L of the rear leg assembly 20, which in turn moves the transverse member 80 toward the back end 70R of the latch compartment 70 and the stepping stool assembly 14 into the folded configuration, or pivot the stepping platform 16 downwardly and toward the lower end 20L of the rear leg assembly 20, which in turn moves the transverse member 80 toward the front end 70R of the latch compartment 70 and the stepping stool assembly 14 ready for securement by the latch 68 into the deployed configuration. When pivoting the stepping platform 16 either upwardly or downwardly with respect to the lower end 20L of the rear leg assembly, the stepping stool assembly 14 pivots at the juncture of the rear leg assembly 20 and the rear end 16R of the stepping platform 16, at the juncture of the front leg assembly 18 and the front end 16F of the stepping platform, and at the junctures of the stretcher beams 22 and the front and rear leg assemblies 18 and 20. This ability of the stepping stool assembly 14 to pivot at these junctures enables it to transition between the deployed configuration and the folded configuration.

Figure 8:
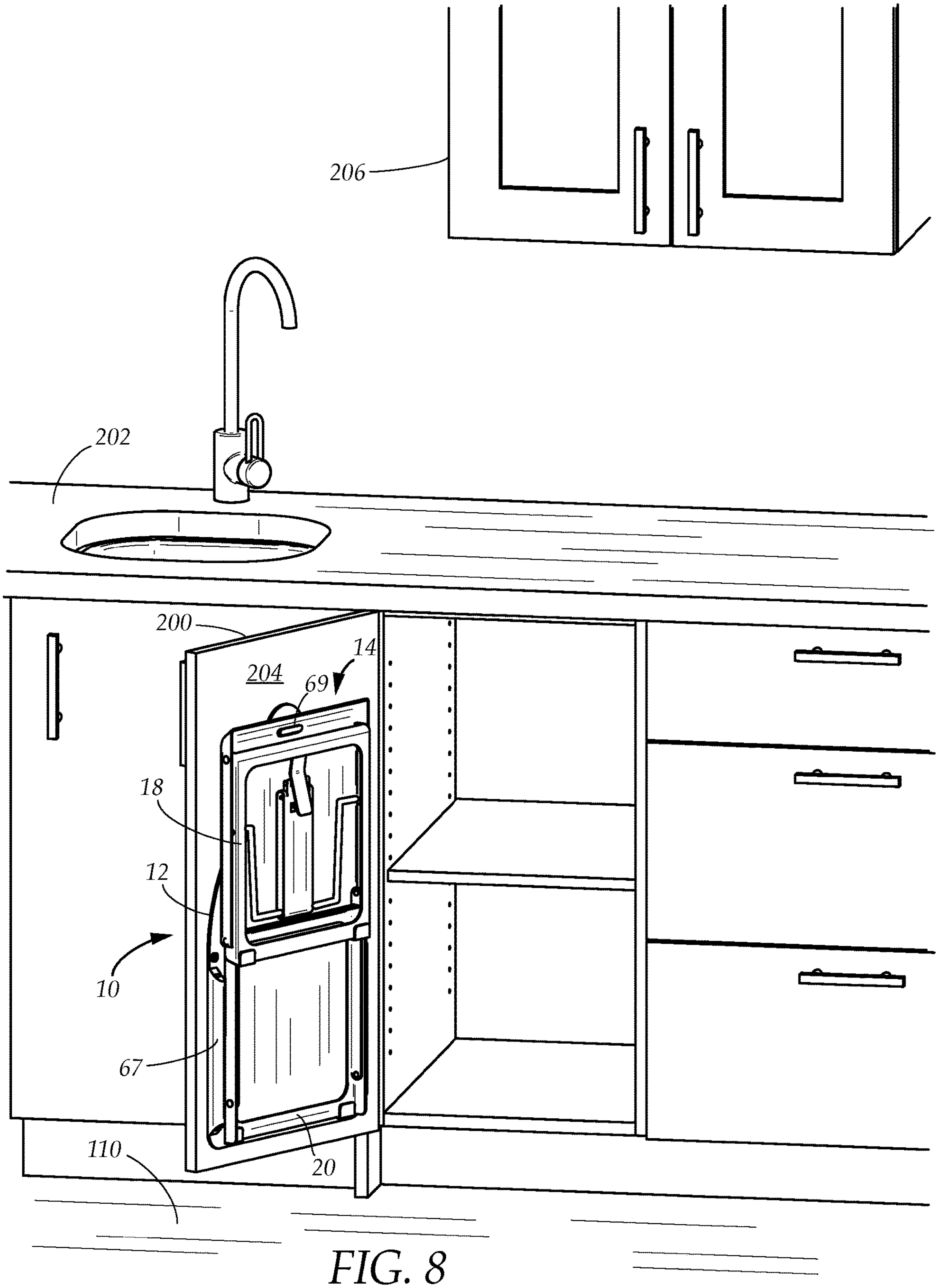
FIG. 8 is a perspective view of the foldaway stepping stool mounted onto the interior surface of a cabinet door adjacent to a kitchen sink, illustrating the stepping stool assembly suspended in its folded configuration on the backplate and further illustrating a type of cabinet door in which the foldaway stepping stool may be attached to according to one embodiment of the present disclosure.
Figure 9:
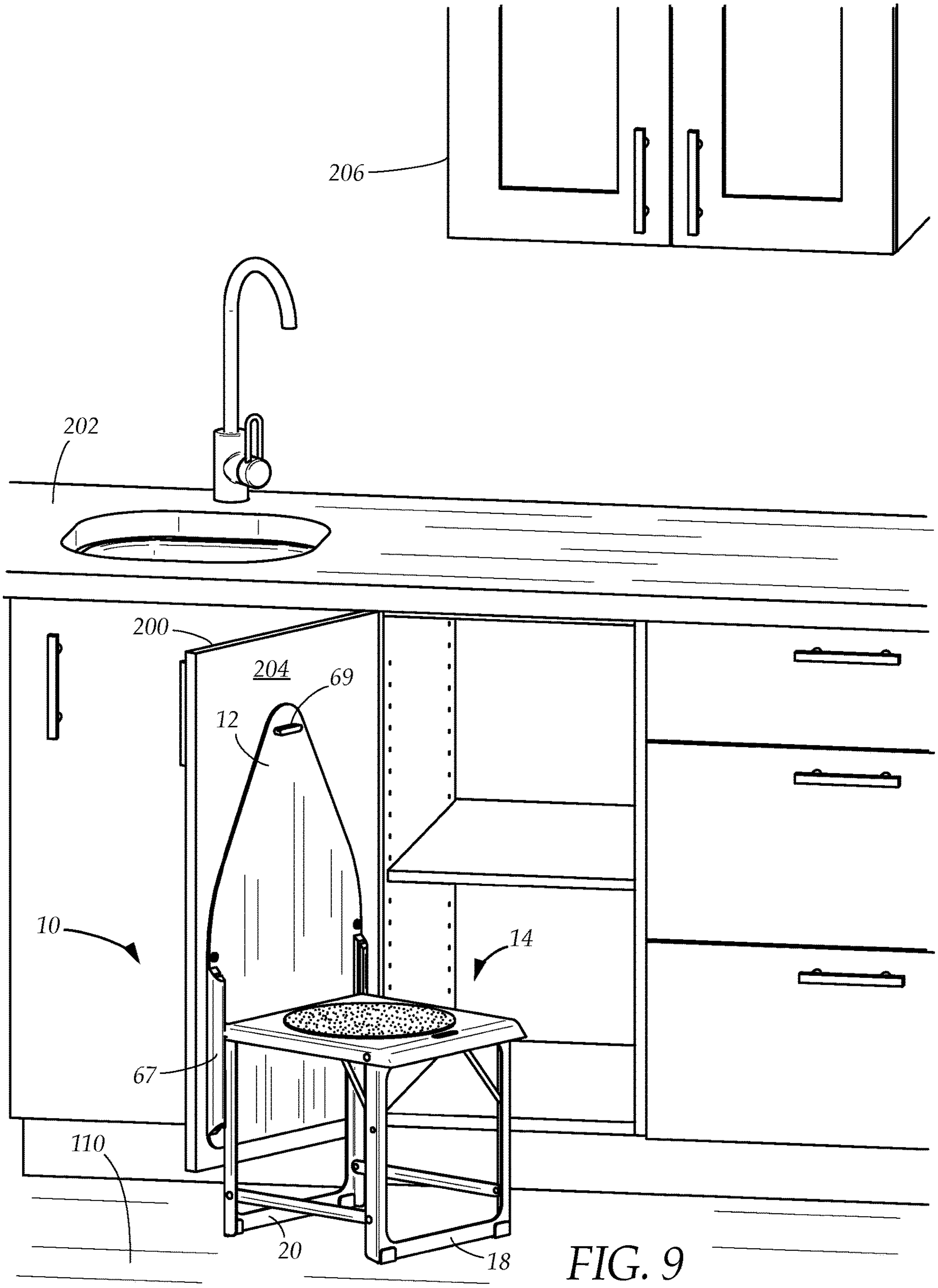
FIG. 9 is a perspective view of the foldaway stepping stool mounted onto the interior surface of a cabinet door adjacent to a kitchen sink, illustrating the stepping stool assembly in its deployed configuration on the backplate and positioned within the track to contact the floor surface and support the cabinet door in a stabilized configuration thereby readying the foldaway stepping stool for usage according to one embodiment of the present disclosure.
Figure 10:
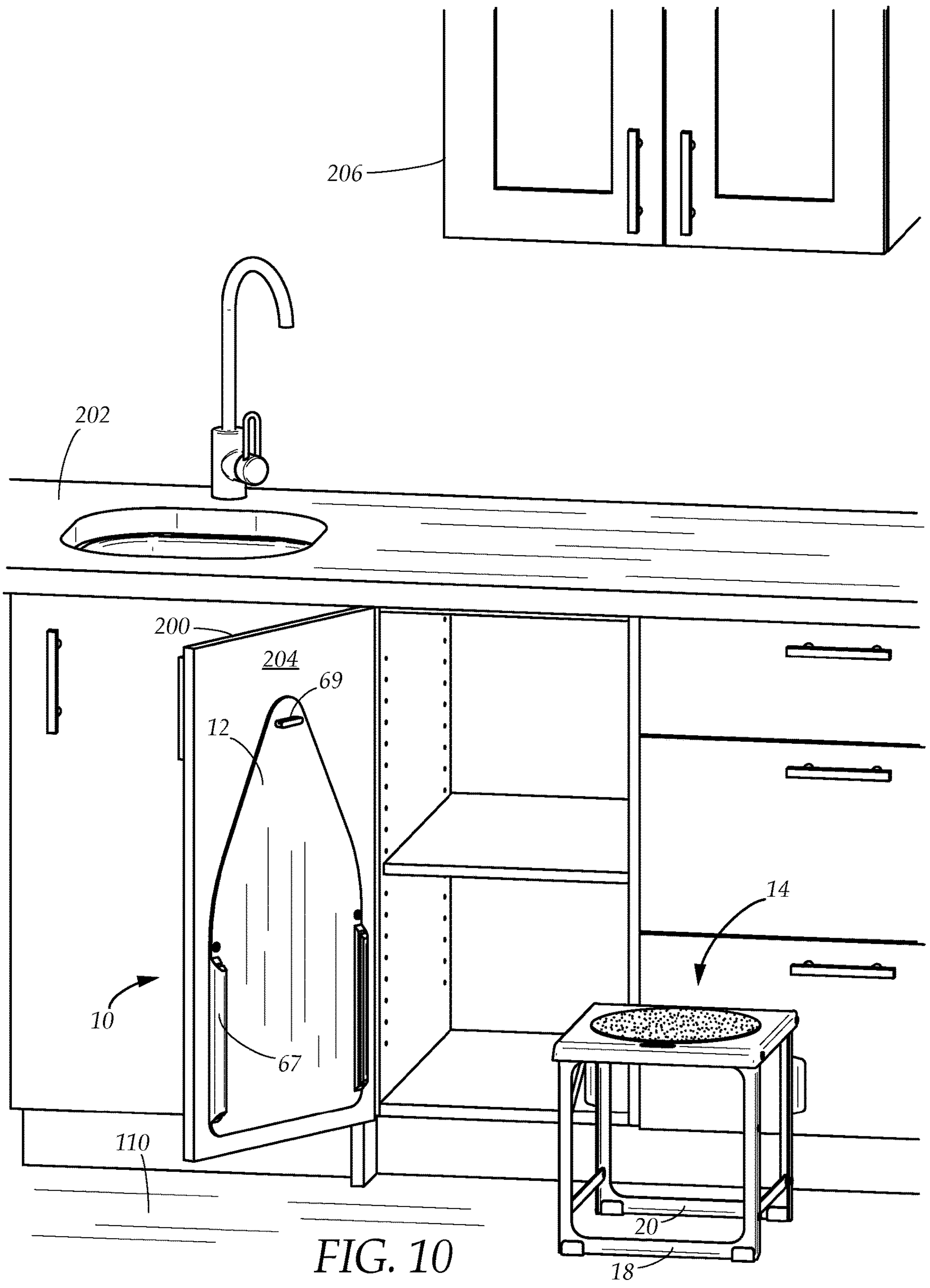
FIG. 10 is a perspective view of the foldaway stepping stool mounted onto the interior surface of a cabinet door adjacent to a kitchen sink, illustrating the stepping stool assembly in its deployed configuration removed from the backplate for remote usage according to one embodiment of the present disclosure.

Referring now to FIG. 8, FIG. 9, and FIG. 10, in embodiments, a user may install the foldaway stepping stool 10 on a cabinet door 200 adjacent a kitchen sink 202 for use in accessing elevated cabinets 206 in the kitchen. The backplate 12 may be mounted onto the interior surface 204 of the cabinet 200 for easy access to the stepping stool assembly 14 as well as for usage of the stepping stool assembly 14 at the cabinet door 200 and for easy stowing of the stepping stool assembly 14. To stow the foldaway stepping stool 10 the stepping stool assembly 14 may be collapsed into the folded configuration and hung or suspended on the hook member 69 of the backplate 12. To use the foldaway stepping stool 10 locally, i.e., at the backplate 12, the stepping stool assembly 14 may be removed from the hook member 69 and extended into the deployed configuration. Once extended, the stepping stool assembly 14 may be slidably mounted onto the track 67 and slid down such that the front leg assembly 18 and the rear leg assembly 20 contact the floor surface 110. To use the foldaway stepping stool 10 remotely, i.e., away from the backplate 12, the stepping stool assembly 14 may simply be removed from the track 67 and utilized in any location.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly. The term "substantially" is defined as at least 95% of the term being described and/or within a tolerance level known in the art and/or within 5% thereof.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a foldaway stepping stool apparatus. The disclosure is illustrated by example in the drawing figures, and throughout the written description. It should be understood that numerous variations are possible, while adhering to the inventive concept. Such variations are contemplated as being a part of the present disclosure.

What is claimed is:

1. A foldaway stepping stool apparatus mountable to a cabinet including a door having an exterior surface, an interior surface, an upper edge and a lower edge, the foldaway stepping stool comprising:

a stepping stool assembly collapsible into a folded configuration and extendable into a deployed configuration, the stepping stool assembly including a stepping platform having a rear end, a front end, the rear end opposite the front end, a left side, a right side, the left side opposite the right side, an upper surface, and a lower surface, the upper surface opposite the lower surface, a front leg assembly including an upper end and a lower end, the upper end pivotably connected to the front end of the stepping platform, the upper end spanning substantially the length of the front end, a rear leg assembly including an upper end and a lower end, the upper end of the rear leg assembly pivotably connected to the rear end of the stepping platform, the upper end of the rear leg assembly spanning substantially the length of the rear end of the stepping platform, a stretcher beam pivotably connected to the lower end of the rear leg assembly and pivotably connected to the lower end of the front leg assembly, the stretcher beam interconnecting the rear leg assembly and the front leg assembly to enable parallel movement of the front leg assembly relative to the rear leg assembly, a latch mechanism disposed on the lower surface of the stepping platform, and a bracket slidably coupled to the latch mechanism and pivotably connected to the front leg assembly, the latch mechanism configured to lock the stepping stool assembly in the deployed configuration to secure the stepping stool assembly in position and prevent inadvertent lateral movement of the stepping stool assembly, the latch mechanism further securing and freeing movement of the bracket, which in turn secures and frees movement of the front leg assembly with respect to the rear leg assembly and the stepping platform to enable selective movement of the stepping stool assembly between the deployed configuration and the folded configuration; and a backplate removably attachable to the interior surface of the cabinet door between the upper edge and the lower edge of the cabinet door, the backplate including an upper end, a lower end, the upper end opposite the lower end, a left side, a right side, the left side opposite the right side, and a track for removably receiving the rear leg assembly when the backplate is attached to the cabinet door, the track enabling the rear leg assembly to slide vertically along the track with respect to the cabinet door for use of the stepping stool assembly at the door, the rear leg assembly held in the track above a floor surface in the folded configuration, the rear leg assembly to slide upward entirely out of the track to detach the stepping stool assembly entirely from the backplate for use of the stepping stool assembly away from the door, and the rear leg assembly to slide downward through the track to contact the floor surface to support the cabinet door and foldaway stepping stool apparatus in a stabilized configuration.

2. The foldaway stepping stool of claim 1, wherein the rear leg assembly includes a pair of guide members protruding outwardly therefrom, the pair of guide members slidably engageable with the track enabling the stepping stool assembly to slide vertically with respect to the backplate.

3. The foldaway stepping stool of claim 2, wherein the rear leg assembly comprises a pair of vertical support members including a first vertical support member and a second vertical support member parallel to each other and a pair of horizontal support members including a first horizontal support member and a second horizontal support member parallel to each other, the pair of vertical support members connected to the pair of horizontal support members forming a rectangular frame supporting the stepping platform.

4. The foldaway stepping stool of claim 3, wherein the pair of guide members include a first guide member disposed on an upper end of the first vertical support member and a second guide member disposed on an upper end of the second vertical support member.

5. The foldaway stepping stool of claim 4, wherein the track comprises a pair of vertically extending tracks including a first track extending vertically along the left side of the backplate and a second track extending vertically along the right side of the backplate, the first guide member slidably disposed within the first track and the second guide member slidably disposed within the second track, the pair of tracks enabling the rear leg assembly to slide vertically downwardly along the backplate past the lower edge of the cabinet door to contact the floor surface.

6. The foldaway stepping stool of claim 5, wherein the front leg assembly comprises a second pair of vertical support members including a third vertical support member and a fourth vertical support member parallel to each other and a second pair of horizontal support members including a third horizontal support member and a fourth horizontal support member parallel to each other, the second pair of vertical support members connected to the second pair of horizontal support members forming a second rectangular frame supporting the stepping platform.

7. The foldaway stepping stool of claim 6, wherein the latch mechanism comprises a latch pivotally connected to a latch compartment, the latch including a flange and a lever for pivoting the latch with respect to the latch compartment between a locking position and an unlocking position, the latch compartment including an opening extending transversely across the latch compartment that defines a track for guiding the bracket longitudinally along the latch compartment, and a slot for receiving the flange therethrough, the latch biased toward the locking position in which the flange extends through the slot, the latch pivotable to the unlocking position in which the flange is positioned external to the slot by depressing the lever toward the lower surface of the stepping platform.

8. The foldaway stepping stool of claim 7, wherein the latch compartment is positioned centrally on the lower surface of the stepping platform and extends from the front end of the stepping platform toward the rear end, the latch compartment further including a back end adjacent to the rear end of the stepping platform, a front end adjacent to the front end of the stepping platform, a first open side extending from the back end to the front end of the latch compartment, a second open side extending from the back end to the front end of the latch compartment, a hollow interior extending from the first open side to the second open side forming the opening, a top surface positioned against the lower surface of the stepping platform, a lower surface opposite the top surface, and the slot in the lower surface, the slot adjacent to the front end of the latch compartment.

9. The foldaway stepping stool of claim 8, wherein the bracket comprises a U-shaped member including a pair of lateral members interconnected by a transverse member, the pair of lateral members including a first lateral member connected to the third vertical support member and a second lateral member connected to the fourth vertical support member, the transverse member extending through the track of the latch compartment, the transverse member slidable longitudinally along the track between the back end and the front end of the latch compartment.

10. The foldaway stepping stool of claim 9, where in the deployed configuration the flange extends through the slot trapping the transverse member between the flange and the front end of the latch compartment, thereby locking the bracket in position and securing the front leg assembly in position.

11. The foldaway stepping stool of claim 10, wherein to transition the stepping stool assembly from the deployed configuration to the folded configuration, the lever is depressed to move the latch into the unlocked configuration, thereby releasing the transverse member and enabling the transverse member to slide along the latch compartment from the front end toward the back end and the front leg assembly to pivot with respect to the stepping platform to fold the stepping platform upwardly and inwardly toward the backplate and the front leg assembly upwardly and inwardly toward the backplate.

12. The foldaway stepping stool of claim 11, wherein:

in the deployed configuration the pair of lateral members extend diagonally from the stepping platform to the front leg; and in the folded configuration the stepping platform lies substantially flat against the backplate, the front leg assembly and the rear leg assembly are parallel with respect to each other, and the transverse member is positioned in the back end of the latch compartment.

13. The foldaway stepping stool of claim 12, wherein the stepping platform further comprises a hole disposed on the front end, the hole extending from the upper surface to the lower surface.

14. The foldaway stepping stool of claim 13, wherein the backplate further comprises a hook member configured to removably engage the hole of the stepping platform to hold the stepping stool assembly in the folded configuration against the backplate for stowing.

15. The foldaway stepping stool of claim 14, wherein the upper surface of the stepping platform further comprises a circular gripping area spanning the majority of area of the upper surface to provide traction when a user steps on the stepping platform.

16. The foldaway stepping stool of claim 15, wherein the left side and the right side of the backplate each define an edge along which the first track and the second track extend, respectively.

17. The foldaway stepping stool of claim 16, wherein the backplate tapers in width from the pair of tracks to the upper end.

18. The foldaway stepping stool of claim 17, wherein the backplate further comprises an aperture for receiving a fastener therethrough to fasten the backplate to the interior surface of the cabinet door.

19. The foldaway stepping stool of claim 18, wherein the second horizontal support member of the rear leg and the fourth horizontal support member of the front leg include grips for gripping a floor and maintaining the stepping stool in position while deployed and in use.

20. The foldaway stepping stool of claim 19, wherein the front end of the stepping platform includes a lip extending outwardly facilitating access to the hole and latch by a user.

* * * * *